N. F. Mathewson.
Horse Hay Fork.
No. 86934.
Patented Feb. 16. 1869.
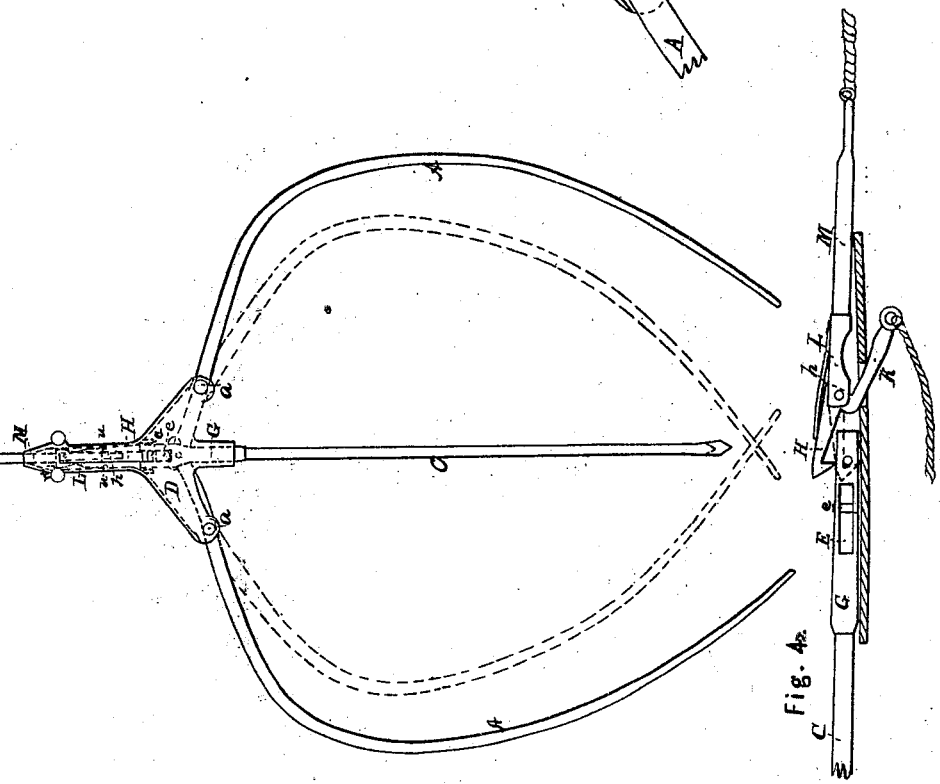
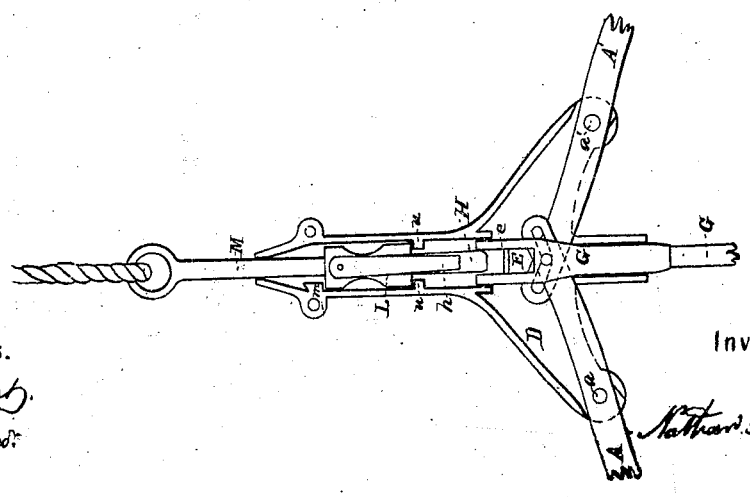
Witnesses.
N. B. Vincent
J. H. Shankland
Inventor.
Nathan F. Mathewson

NATHAN F. MATHEWSON, OF BARRINGTON, RHODE ISLAND.

Letters Patent No. 86,934, dated February 16, 1869.

IMPROVEMENT IN HORSE HAY-FORKS.

The Schedule referred to in these Letters Patent and making part of the same.

*To all whom it may concern:*

Be it known that I, NATHAN F. MATHEWSON, of Barrington, in the county of Bristol, and State of Rhode Island, have invented a new and improved "Horse Hay-Fork;" and I do hereby declare that the following specification, taken in connection with the drawings making a part of the same, is a full, clear, and exact description thereof.

Figure 1 is a view of my improved fork, the blue lines representing the tines closed.

Figures 2 and 3 show the mechanism for locking the tines, a portion of the case being removed.

Figure 4 shows the arrangement of the parts, and the manner of unlocking the tines.

In horse hay-forks, as in all other labor-saving machines, inventors have endeavored to produce a mechanism which should be simple in its construction, yet not without durability, and one which at all times should be perfect in its practical operations.

Taking into consideration the great number of inventions of this class, each having its peculiar mechanism and construction, I shall not attempt a review, for the purpose of noticing their several defects, but will merely mention the result of their most common imperfections, which, in some, consist in the opening of the tines at improper times, and, in others, their incapability of being opened at the proper time, by the means or device provided for that purpose.

To overcome these defects, and, at the same time, combine durability and simplicity of construction, is the object of my invention, which I will now proceed to describe.

My improved fork consists of two curved tines A A', fig. 1, a straight tine, C, and a case or head-piece, D, within which the mechanism that locks and unlocks the tines is enclosed.

The straight tine C is attached to an end-piece, G, (figs. 2 and 3,) which is mortised to receive the slotted ends of the curved tines, which are secured therein by means of a pin, and also attached to the case D by screws $a$ and $a'$.

The end-piece G is also provided with another mortise, E, open at the end, having a pin, $e$, (figs. 2, 3, and 4,) passing through it, over which the pawl H catches, when the tines A A' become closed, and, by the aid of the spring $h$, locks them firmly in that position.

The rod M is furnished at one end with a ring, to which the hoisting-rope is fastened, while the other end is attached to the block L, formed as shown in figs. 2, 3, and 4, or in any other desirable shape, with which the pawl H and lever K—both being of the same piece—are connected by means of a mortise and pin, the block L being secured in its place by stops $m$, $n$, and $n'$.

The operation of my invention is as follows, commencing with the tines open. The operator forces the fork into the hay, when the tines A A', (figs. 1 and 2,) by reason of their curved form, converge at the points and raise the tine C and end piece G, by the well-known principle employed in a simple lever; the screws $a$ $a'$ being the fulcra, and the short arms being permitted by the slots to vary in length until the pin $e$ is driven under and caught by the pawl H, which is held by the spring $h$, in the position shown in blue, (fig. 4,) thus locking the tines in the position shown in blue, (fig. 1.) The tines are now full of hay, closed, and locked, and the fork is next hoisted up, with its burden, and, when brought to the desired place, the operator pulls the cord attached to the lever K, which is constructed with reference to the pawl H, so as to secure the greatest leverage. The resistance of the spring $h$ is overcome, and the pawl H forced to release its hold upon the pin $e$, when the weight of the hay spreads apart the tines and falls out.

I do not claim the tines as a part of my invention, but only such variations in the construction of the same, from others now in use, as will adapt them to the mechanism herein described; but What I do claim as my invention, and desire to secure by Letters Patent, is—

1. The combination of the end-piece G with the tines A A' and C.
2. The combination of the rod M, block L, pawl H, spring $h$, and lever K.
3. The combination of the pawl H, end-piece G, and slotted tines A and A', the whole constructed and arranged substantially as and for the purposes specified.
4. The stops $m$, $n$, and $n'$, constructed, with reference to the block L, substantially as described.

NATHAN F. MATHEWSON.

Witnesses:
   W. B. VINCENT,
   J. H. SHANKLAND.